United States Patent [19]
Ikeda et al.

[11] Patent Number: 6,115,213
[45] Date of Patent: Sep. 5, 2000

[54] BEARING ASSEMBLY HAVING COMPACT THICKNESS, SPINDLE MOTOR AND ACTUATOR USING THE SAME BEARING ASSEMBLY, AND MAGNETIC DISK DRIVE

[75] Inventors: Hiroshi Ikeda, Ibaraki; Shinobu Yoshida, Tsuchiura; Masahiko Sega, Hiratsuka, all of Japan

[73] Assignee: Hitachi, Ltd., Tokyo, Japan

[21] Appl. No.: 08/913,343

[22] PCT Filed: Mar. 17, 1995

[86] PCT No.: PCT/JP95/00480

§ 371 Date: Sep. 11, 1997

§ 102(e) Date: Sep. 11, 1997

[87] PCT Pub. No.: WO96/29521

PCT Pub. Date: Sep. 26, 1996

[51] Int. Cl.[7] .............................. G11B 17/08; F16C 19/00; H02K 5/16
[52] U.S. Cl. .......................... 360/99.08; 310/90; 384/461
[58] Field of Search .............................. 360/97.01, 98.07, 360/99.04, 99.08, 106, 903; 310/67 R, 90; 369/222, 269; 384/461

[56] References Cited

U.S. PATENT DOCUMENTS 4,866,324  9/1989  Yuzawa et al. .......................... 310/268
5,394,283  2/1995  Hans et al. ............................ 360/98.07
5,412,522  5/1995  Lockhart et al. ..................... 360/97.01

FOREIGN PATENT DOCUMENTS 58-55362  12/1983  Japan.
63-274338  11/1988  Japan.

*Primary Examiner*—William R. Korzuch
*Attorney, Agent, or Firm*—Antonelli, Terry, Stout & Kraus, LLP

[57] ABSTRACT

A magnetic disk drive which is to be used for recording and/or reproducing information, and a bearing assembly for use in the same magnetic disk drive. The bearing assembly includes two bearings of different diameters, of which a small-diameter bearing is arranged within an inner periphery of a large-diameter bearing. The two bearings are joined by means of bearing coupling members for connecting respectively inner rings and outer rings of the bearings. The small-diameter bearing is arranged within the inner periphery of the large-diameter bearing, and therefore a height of the bearing assembly can be made thinner to about one and a half times a height of a single bearing. It is therefore possible to make the magnetic disk drive smaller and thinner by employing this bearing assembly.

8 Claims, 12 Drawing Sheets

BEARING ASSEMBLY HAVING COMPACT THICKNESS, SPINDLE MOTOR AND ACTUATOR USING THE SAME BEARING ASSEMBLY, AND MAGNETIC DISK DRIVE

TECHNICAL FIELD

The present invention relates to information equipment such as a magnetic disk drive and so on, and more particularly to a compact magnetic disk drive of a thin thickness and a structure of a bearing assembly which is to be used therein.

BACKGROUND ART

Information equipment includes apparatus for recording and reading information, one of which is a magnetic disk drive.

A typical structure of conventional magnetic disk drive will be described with reference to FIG. 20 which is a sectional view thereof. A spindle motor for rotating a magnetic disk 1302, on which magnetic information is to be recorded and stored, comprises bearings 1303 and 1305 disposed in the center thereof in axially stacked relation to each other, a member 1308 formed integrally with a shaft which rotates in combination with inner rings of the bearings, a magnet 1307 attached to the member 1308, and a coil 1306 disposed on a base 1309. The magnetic disk 1302 is fixed to the member 1308 by means of a fixing member 1310.

An actuator for positioning a slider on which mounted is a magnetic head which moves on a surface of the magnetic disk 1302 so as to record and/or reproduce magnetic information, comprises a shaft 1313 press-fitted in a base 1301, two bearings 1312 and 1314 fitted on the shaft in series, a carriage 1315 oscillating about the shaft, a magnet 1316 for applying a magnetic field to the carriage, and a load arm 1311 supporting the slider having the magnetic head mounted thereon and attached to the carriage.

There is provided a cover 1317 which encloses the spindle motor, the actuator and so on while being kept in airtight relation to the base on which the spindle motor and the actuator are fixed. A control circuit for controlling the magnetic disk drive is provided on a substrate 1318 disposed below the base, and a connector 1319 used for the power supply from external circuit and for input/output of information is connected to the substrate 1318.

In such conventional magnetic disk drive, the spindle motor and the actuator each use two bearings arranged on the shaft in series, and therefore there is a limit in making the magnetic disk drive thinner.

As for the structure for making the magnetic disk drive thinner, Japanese Patent Unexamined Publication No. 3-169250 discloses one in which two bearings are arranged coaxially in one plane in such a manner that a second bearing is disposed between an outer peripheral surface of a hub and an inner peripheral surface of a housing, these outer and inner peripheral surfaces facing to each other.

DISCLOSURE OF INVENTION

Recent demands for saving space and lighter weight for computer, attributed to downsizing of computer, are causing a tendency to make peripheral equipment ever smaller as well. As for the magnetic disk drive, the demands for thinner thickness and smaller size are increasing naturally. It is considered, as one of methods of realizing these demands, to make the bearing structure of the magnetic disk drive ever thinner.

The bearing structure needs to be made of such kind of bearing that is generally available, because the use of special bearing may raise the cost.

A thinner magnetic disk drive comes to be necessary when the magnetic disk drive is considered as a mass storage system in place of IC card. There are PCMCIA Standards for the IC card, e.g. PCMCIA TYPE 1 being 3 mm thick, TYPE 2 being 5 mm thick and TYPE 3 being 10.5 mm thick. In order to follow these standards, it is a problem to make the magnetic disk drive thinner, particularly to make the bearing structure thinner.

As for the bearing of the magnetic disk drive, plain or roller type bearing is used.

However, the plain type bearing involves various problems. Namely, it has low bearing rigidity, it exhibits high resistance at the time of rotating, it is hard to fabricate when designed to be made smaller and thinner, it is liable to be affected by temperature, it requires large torque when starting rotation, and its cost is high.

Meanwhile, the roller type bearing can solve the problems of the plain type bearing described above. However, in case of supporting a shaft only by a single bearing, there is a play in the bearing between inner and outer rings and rolling members such as balls or rollers, and therefore there are further problems that it is hard to coincide the axes of rotation of the inner and outer rings of the bearing with each other, and the rigidity of the bearing is low when the bearing is used solely.

For this reason, it is general in use to combine two roller type bearings. In case of using the two roller type bearings, application of prestressing or preloading force contributes to suppressing the play in the bearing between the inner and outer rings and the rolling members, thereby making it possible to coincide the axes of rotation of the inner and outer rings of the bearing with each other. It is also possible to enhance the rigidity of the bearing.

However, in the prior art of the type in which two bearings are arranged on a shaft in series, the thickness of the bearing structure cannot be reduced to less than twice a thickness of a single bearing.

On the other hand, in the bearing structure disclosed in Japanese Patent Unexamined Publication No. 3-169250, which comprises a first bearing of smaller diameter, a second bearing of larger diameter, a permanent magnet disposed between the first and second bearings and a hub (rotor) which joins an outer ring of the first bearing to an inner ring of the second bearing, a prestressing or preloading force is applied in one direction to the outer ring of the first bearing and the inner ring of the second bearing through the hub by making use of magnetic attraction of the permanent magnet.

Accordingly, when a fluctuating force, produced by the rotation of the hub, causes a displacement in a direction of reducing the prestressing force, that is, a force applied in the opposite direction to the magnetic attraction, those points on the two bearings, to which the prestressing force is applied, shift in the reverse direction simultaneously. During the shifting, those points on the ball members of the bearings, to which the force is applied, become unstable to cause vibration. In order to prevent such phenomenon, an elastic member is disposed on the outer ring of the first bearing of smaller diameter so as to further apply the force in the axial direction, for example, and however it is necessary to increase the magnetic attraction of the permanent magnet for overcoming the reaction force. In this case, a large magnetic attraction is applied just as it is to the inner ring of the second bearing of larger diameter, and therefore there is a possibility of application of forces exceeding a proper prestressing force, resulting in decrease of lifetime, increase of frictional torque and so on in some cases.

A first object of the present invention is to provide a bearing assembly which comprises two bearings but has a thickness corresponding to that of a single bearing, and in which the two bearings are prestressed or preloaded in opposite directions with respect to each other in a manner to withstand external forces at all times even if any external force is applied thereto.

Further, a second object of the invention is to provide a spindle motor and an actuator, each of which comprises a bearing assembly having two bearings but is thin in thickness.

Moreover, another object of the invention is to materialize a thinner magnetic disk drive.

In order to achieve the above-described first object, a first feature of the present invention resides in a bearing assembly comprising: two bearings having the same axis of rotation and joined together rotatably, the two bearings comprising a large-diameter bearing and a small-diameter bearing; an inner ring coupling member for connecting inner rings of the large- and small-diameter bearings; and an outer ring coupling member for connecting outer rings of the large- and small-diameter bearings, wherein an outer diameter of the small-diameter bearing is smaller than an inner diameter of the inner ring of the large-diameter bearing.

A second feature of the invention resides in a bearing assembly comprising: two bearings having the same axis of rotation and joined together rotatably, the two bearings comprising a large-diameter bearing and a small-diameter bearing; an inner ring coupling member for connecting inner rings of the large- and small-diameter bearings; and an outer ring coupling member for connecting outer rings of the large- and small-diameter bearings, wherein the outer ring of the small-diameter bearing is formed integrally with the outer ring coupling member.

A third feature of the invention resides in a bearing assembly comprising: two bearings having the same axis of rotation and joined together rotatably, the two bearings comprising a large-diameter bearing and a small-diameter bearing; an inner ring coupling member for connecting inner rings of the large- and small-diameter bearings; and an outer ring coupling member for connecting outer rings of the large- and small-diameter bearings, wherein the inner ring of the large-diameter bearing is formed integrally with the inner ring coupling member.

A fourth feature of the invention resides in a bearing assembly comprising: two bearings having the same axis of rotation and joined together rotatably, the two bearings comprising a large-diameter bearing and a small-diameter bearing; an inner ring coupling member for connecting inner rings of the large- and small-diameter bearings; and an outer ring coupling member for connecting outer rings of the large- and small-diameter bearings, wherein the outer ring of the small-diameter bearing is formed integrally with the outer ring coupling member, while the inner ring of the large-diameter bearing is formed integrally with the inner ring coupling member.

In order to achieve the above second object, a fifth feature of the invention resides in a spindle motor comprising: a bearing assembly comprising two bearings having the same axis of rotation and joined together rotatably; and a magnet and a coil for producing a torque, wherein the bearing assembly has any of those of the first to fourth features of the invention described above.

The fifth feature of the invention also resides in an actuator comprising: a bearing assembly comprising two bearings having the same axis of rotation and joined together rotatably; and a magnet and a coil for producing a torque, wherein the bearing assembly has any of those of the first to fourth features of the invention described above.

In order to achieve the above third object, a sixth feature of the invention resides in a magnetic disk drive comprising: a spindle motor for rotating a magnetic disk having magnetic information stored therein; a transducer for writing and/or reading information on the magnetic disk; and an actuator for moving the transducer on a surface of the magnetic disk, wherein at least one of bearing assemblies for rotating the spindle motor and for oscillating the actuator comprises a large-diameter bearing, a small-diameter bearing, an inner ring coupling member for connecting inner rings of the large- and small-diameter bearings, and an outer ring coupling member for connecting outer rings of the large- and small-diameter bearings.

The above magnetic disk drive can be carried out in the following preferred modes.

(1) Preferably the inner ring coupling member is fixed, while the outer ring coupling member is rotatable.
(2) It is preferred that the inner ring coupling member is rotatable, while the outer ring coupling member is fixed.
(3) Preferably the small-diameter bearing is disposed within a space defined by an inner periphery of the inner ring of the large-diameter bearing.
(4) In mode (1), it is preferred that the small-diameter bearing is disposed within a space defined by an inner periphery of the inner ring of the large-diameter bearing.
(5) In mode (2), it is preferred that the small-diameter bearing is disposed within a space defined by an inner periphery of the inner ring of the large-diameter bearing.
(6) In mode (1), it is preferred that the inner ring coupling member is formed integrally with the inner ring of the large-diameter bearing.
(7) Preferably a thickness of the bearing assembly is in the range of 1.5 mm~3 mm.
(8) It is preferred that the magnetic disk drive further comprises a drive control circuit for controlling operation of at least the spindle motor and the actuator or transducer, the drive control circuit being arranged in a space extending radially around the spindle motor.

Further, a seventh feature of the invention resides in a magnetic disk drive comprising: a spindle motor for rotating a magnetic disk having magnetic information stored thereon; a transducer for writing and/or reading information on the magnetic disk; an actuator for moving the transducer on a surface of the magnetic disk; and a base on which the spindle motor and the actuator are fixed, wherein at least one of bearing assemblies for rotating the spindle motor and for oscillating the actuator comprises a large-diameter bearing and a small-diameter bearing, and an inner ring of the small-diameter bearing is formed integrally with a shaft integrated with the base.

An eighth feature of the invention resides in a magnetic disk drive comprising: a spindle motor for rotating a magnetic disk having magnetic information stored thereon; a transducer for writing and/or reading information on the magnetic disk; an actuator for moving the transducer on a surface of the magnetic disk; and a base on which the spindle motor and the actuator are fixed, wherein at least one of bearing assemblies for rotating the spindle motor and for oscillating the actuator comprises a large-diameter bearing and a small-diameter bearing, and an outer ring of the small-diameter bearing is formed integrally with a member connected to an outer ring of the large-diameter bearing.

A ninth feature of the invention resides in a magnetic disk drive comprising: a spindle motor for rotating a magnetic disk having magnetic information stored therein; a transducer for writing and/or reading information on the magnetic disk; and an actuator for moving the transducer on a surface of the magnetic disk, wherein at least one of bearing assemblies for rotating the spindle motor and for oscillating the actuator comprises a large-diameter bearing, a small-diameter bearing, an inner ring coupling member for connecting inner rings of the large- and small-diameter bearings, and an outer ring coupling member for connecting outer rings of the large- and small-diameter bearings, the inner ring coupling member being formed integrally with the inner ring of the large-diameter bearing and being rotatable, the outer ring coupling member being fixed.

A tenth feature of the invention resides in a magnetic disk drive comprising: a spindle motor for rotating a magnetic disk having magnetic information stored therein; a transducer for writing and/or reading information on the magnetic disk; and an actuator for moving the transducer on a surface of the magnetic disk, wherein at least one of bearing assemblies for rotating the spindle motor and for oscillating the actuator comprises a large-diameter bearing, a small-diameter bearing, an inner ring coupling member for connecting inner rings of the large- and small-diameter bearings, and an outer ring coupling member for connecting outer rings of the large- and small-diameter bearings, the inner ring coupling member being rotatable, the outer ring coupling member being formed integrally with the outer ring of the small-diameter bearing and being fixed.

In one mode of the above-described magnetic disk drive, it is preferred that the inner ring coupling member is formed integrally with the inner ring of the large-diameter bearing.

Moreover, an eleventh feature of the invention resides in a magnetic disk drive comprising: a spindle motor for rotating a magnetic disk having magnetic information stored therein; a transducer for writing and/or reading information on the magnetic disk; and an actuator for moving the transducer on a surface of the magnetic disk, wherein at least one of bearing assemblies for rotating the spindle motor and for oscillating the actuator has any of those of the first to fourth features of the invention described above, and a thickness of the magnetic disk drive has the form factor of PCMCIA Standards TYPE 1.

A twelfth feature of the invention resides in a magnetic disk drive comprising: a spindle motor for rotating a magnetic disk having magnetic information stored therein; a transducer for writing and/or reading information on the magnetic disk; and an actuator for moving the transducer on a surface of the magnetic disk, wherein at least one of bearing assemblies for rotating the spindle motor and for oscillating the actuator has any of those of the first to fourth features of the invention described above, and a thickness of the magnetic disk drive has the form factor of PCMCIA Standards TYPE 2.

A thirteenth feature of the invention resides in a magnetic disk drive comprising: a spindle motor for rotating a magnetic disk having magnetic information stored therein; a transducer for writing and/or reading information on the magnetic disk; and an actuator for moving the transducer on a surface of the magnetic disk, wherein at least one of bearing assemblies for rotating the spindle motor and for oscillating the actuator has any of those of the first to fourth features of the invention described above, and a thickness of the magnetic disk drive has the form factor of PCMCIA Standards TYPE 3.

According to the present invention having the features described above, two bearings are not arranged in series in the axial direction but arranged in such a manner that a small-diameter bearing overlaps within an inner periphery of a large-diameter bearing in the heightwise direction, and therefore the thickness, which has conventionally been required to be twice a height of the bearing, can be reduced as small as the height of a single bearing, resulting in that the magnetic disk drive can be made thinner as a whole.

It is possible in the magnetic disk drive having two bearings to form a bearing assembly section with a thickness corresponding to the height of a single bearing as described above, and therefore if a bearing of about 1 mm thickness is used it is possible to produce a magnetic disk drive which has, in a state with a magnetic disk loaded therein, a thickness less than 3.3 mm corresponding to the form factor of PCMCIA Standards TYPE 1. Further, a magnetic disk drive of the type in which an increased number of magnetic disks can be loaded, can be easily produced with a thickness being less than 5 mm for PCMCIA Standards TYPE 2, or less than 10.5 mm for TYPE 3.

Moreover, the inner rings as well as the outer rings of the large- and small-diameter bearings are connected by means of the respective coupling members, and therefore the two bearings are applied with a prestressing or preloading force from opposite directions with respect to the bearing, and the directions in which the prestressing force is applied to these bearings are opposite to each other.

With the above structure, even if the bearing assembly is applied with an external force from any direction, the prestressing force acts to withstand the external force at all times, and therefore the bearing assembly never becomes unstable and hence no vibration will appear.

More specifically, as shown in FIG. 21, when an axial load F or G is applied to a coupling member i, for example, the load F is born by a large-diameter bearing a first, while the load G is born by a small-diameter bearing b first, in each case the load acting in the directions in which a prestressing force is applied (in the directions c in the drawing, shown merely on one side with respect to the axis of rotation). Accordingly, one of the two bearings can bear the load in the proper direction.

In order to apply the prestressing force to the bearings in such a manner that the prestressing force is applied to the inner rings, the outer rings and the rolling members of the small- and large-diameter bearings in opposite directions, dimensions of inner and outer ring coupling members are decided as described in the following.

Namely, as shown in FIG. 21, based on the axial positions of the two bearings, an axial distance m from an upper surface of that portion of the inner ring coupling member which is fixed to the inner ring of the small-diameter bearing to a lower surface of the inner ring of the large-diameter bearing, and an axial distance n from a lower surface of the outer ring of the small-diameter bearing, which is fixed to the outer ring coupling member, to an upper surface of the outer ring of the large-diameter bearing, are decided in such a manner that the prestressing force is applied to the inner rings, the outer rings and the rolling members of the small- and large-diameter bearings in opposite directions. According to these distances the coupling members are manufactured.

Moreover, when the inner or outer ring coupling member is formed integrally with the inner or outer ring of the bearing, it is advisable to decide the dimensions so that the inner or outer ring formed integrally with the coupling member may apply the prestressing force to the rolling members in the same manner as described above.

If the inner or outer ring coupling member is formed integrally with the inner or outer ring of the bearing, the number of component parts can be reduced.

BEST FORM EMBODYING THE INVENTION

Embodiments of the invention will be described below with reference to the drawings.

A first embodiment of the invention will be described with reference to FIGS. 1~7.

Figure 1:
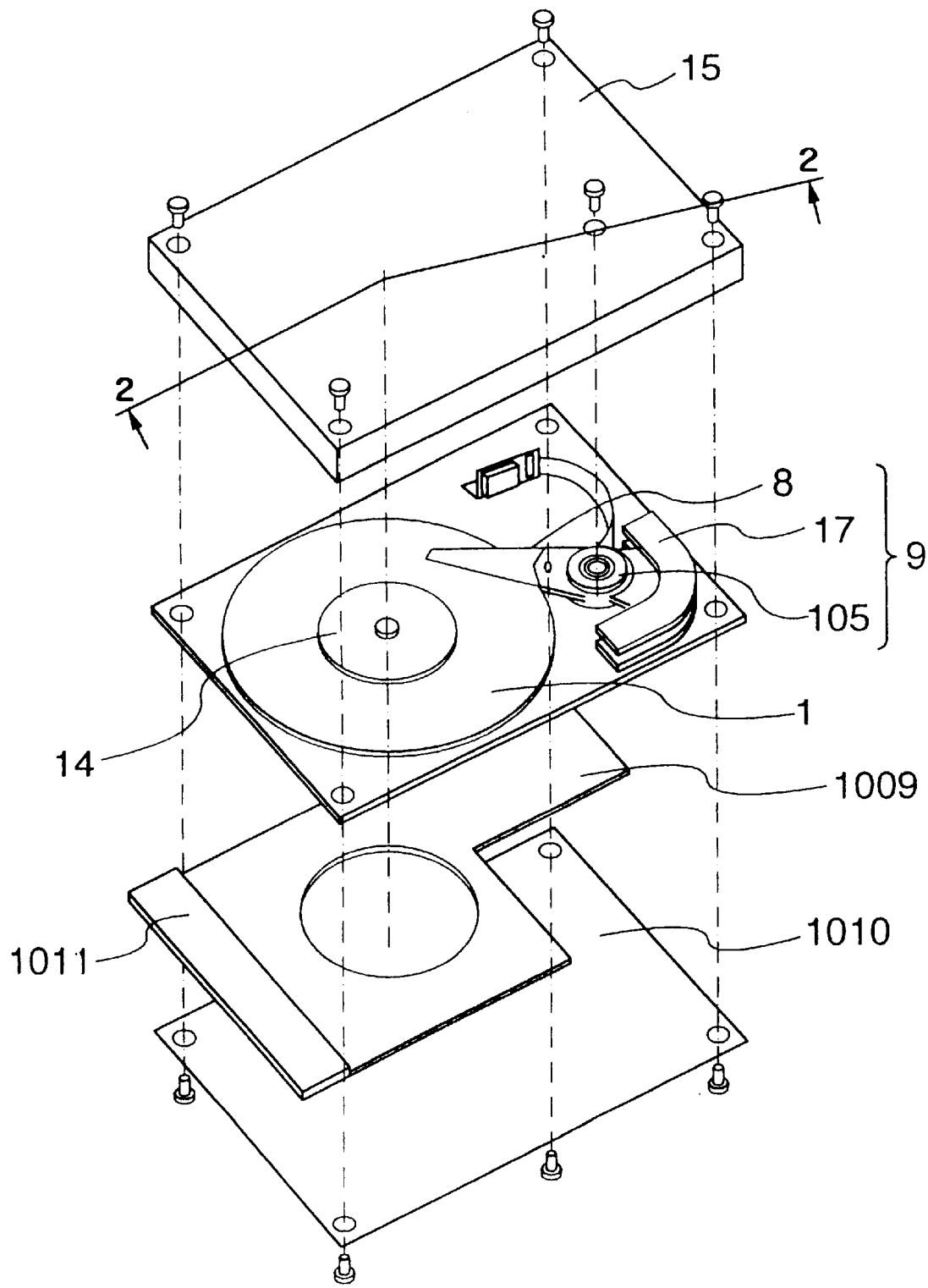
FIG. 1 is a perspective view of a magnetic disk drive according to a first embodiment of the present invention.

FIG. 1 is an exploded perspective view of a magnetic disk drive of this embodiment.

Figure 2:
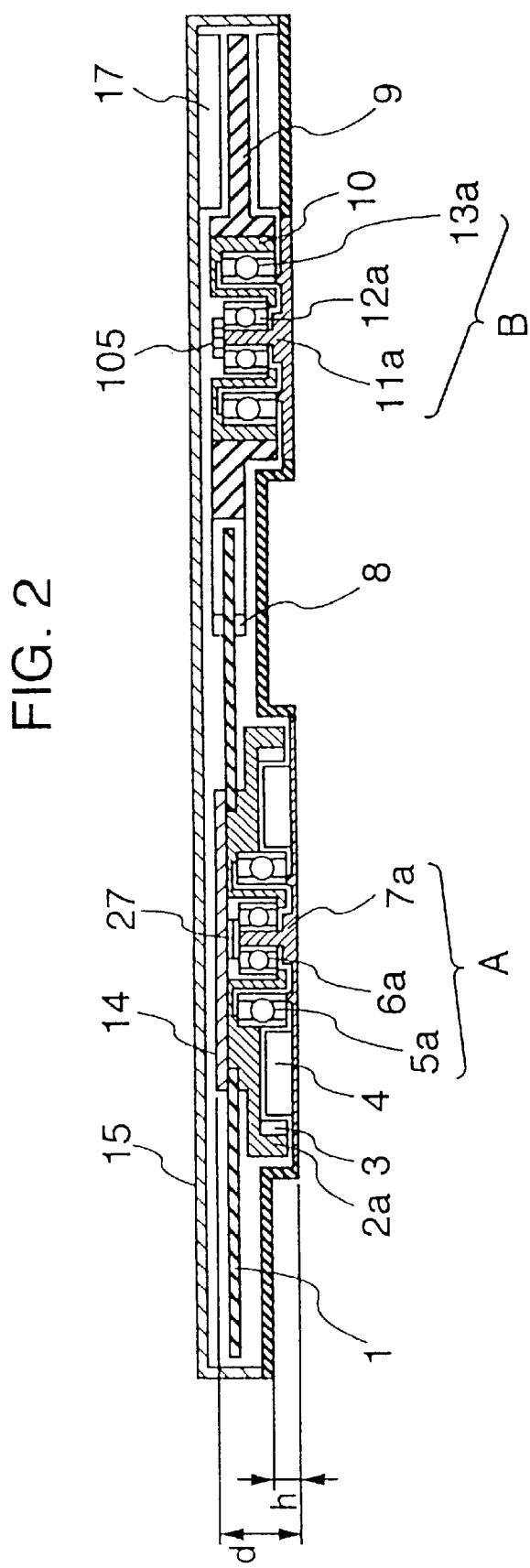
FIG. 2 is a sectional view taken of a A—A section of FIG. 1.

FIG. 2 is a sectional view of a E—E section of FIG. 1, exclusive of a lower cover 1010, a printed wiring board 1009 and an electric connector 1011.

The magnetic disk drive of this embodiment comprises, as shown in FIGS. 1 and 2, a transducer for converting electric signal into magnetic signal and vice versa, a transducer support member 8, an actuator 9 for causing the transducer and the transducer support member to oscillate, the actuator 9 having a magnet 17 and a carriage, a magnetic disk 1 having a surface on which magnetic signal may be stored, a fixing member 14 for fixing the magnetic disk 1, a spindle motor for rotating the magnetic disk 1, bases 11a and 7a on which the actuator and the spindle motor are fixed respectively, and a cover 15.

The printed wiring board 1009 is arranged in a space portion with an axial height h formed around the spindle motor to extend in the radial direction as shown in FIG. 2. The electric connector 1011 is formed at an end face of the printed wiring board 1009, which is parallel to a plane of the magnetic disk 1. Connection of the electric connector 1011 to the external circuit makes power supply and input/output of signal with respect to the magnetic disk drive.

In the magnetic disk drive of this embodiment, there are provided two bearing assemblies, that is, a bearing assembly A for rotating the magnetic disk 1 and a bearing assembly B in the actuator 9 section.

Figure 3:
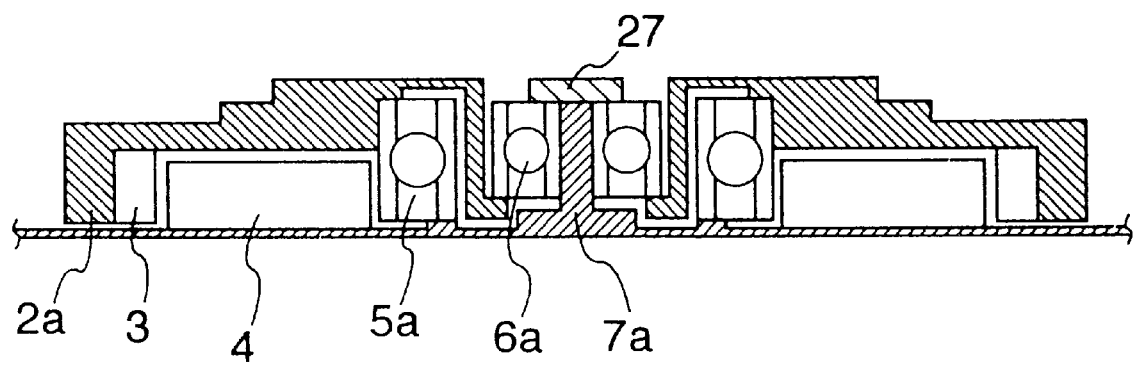
FIG. 3 is an enlarged sectional view of a bearing assembly A section of FIG. 2.

The bearing assembly A for rotating the magnetic disk 1 will now be described with reference to FIG. 3 which is a partial enlarged view of FIG. 2.

The base 7a is formed integrally with a fixing shaft on which a bearing is fixed. A first bearing 6a of smaller diameter is fixed on the fixing shaft, formed integrally with the base 7a, by means of a fixing member 27 so as to prevent an inner ring of the bearing from moving in the axial direction. An outer ring of the first bearing 6a of smaller diameter and an outer ring of a second bearing 5a of larger diameter are combined and rotatably held by means of a bearing coupling member 2a in such a manner that the first bearing 6a overlaps within an inner periphery of the second bearing 5a in the heightwise direction of the bearing.

The bearing coupling member 2a connects the axially lower surface of the outer ring of the first bearing to the upper surface of the outer ring of the second bearing 5a.

An inner ring of the second bearing 5a of larger diameter is held by the base 7a in contact relation thereto. The bearing coupling member 2a is rotated by means of a magnet 3 and a coil 4.

An axial distance between those end faces of the bearing coupling member 2a, which are brought into contact with the outer rings of the first and second bearings 6a and 5a, is decided in such a manner that when the inner ring of the first bearing 6a is axially pressed in by the bearing fixing member 27, loads acting axially in opposite directions are applied to the first and second bearings 6a and 5a respectively.

Therefore the bearings are prestressed or preloaded in opposite directions constantly. For this reason, even if load is applied in the axial direction of the bearing from various directions, the load can be received by the prestressed bearings at all times so that no vibration will appear, and accordingly rotating accuracy can be maintained and occurrence of noise can be suppressed.

Figure 4:
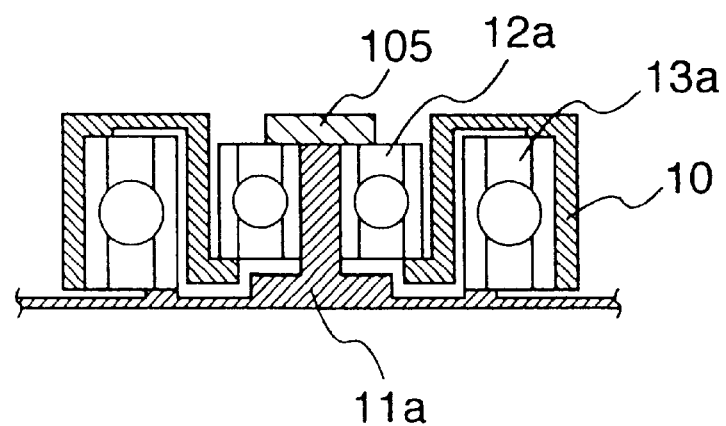
FIG. 4 is an enlarged sectional view of a bearing assembly B section of FIG. 2.

Meanwhile, the bearing assembly B of the actuator 9 section will be described with reference to FIG. 4 which is a partial enlarged view of FIG. 2. The base 11a is formed integrally with a fixing shaft. A third bearing 12a of smaller diameter has its inner ring held in contact relation to the fixing shaft, formed integrally with the base 11a, by means of a fixing member 105 lest it should move. An outer ring of the third bearing 12a of smaller diameter and an outer ring of a fourth bearing 13a of larger diameter are combined and rotatably held by means of a bearing coupling member 10 in such a manner that the third bearing 12a overlaps within an inner periphery of the fourth bearing 13a in the heightwise direction of the bearing.

An inner ring of the fourth bearing 13a of larger diameter is fixed on the base 11a. An axial distance between those end faces of the bearing coupling member 10, which are brought into contact with the outer ring of the third bearing 12a and the outer ring, is decided such that when the inner ring of the third bearing is axially pressed in by the bearing fixing member 105, the third and fourth bearings 12a and 13a are applied with loads which act axially in opposite directions, respectively.

In consequence, the bearings are constantly applied with prestressing forces which act in opposite directions, and therefore even if load is applied in the axial direction of the bearing from various directions, the load can be born by the prestressed bearings at all times so that no vibration will appear, and accordingly rotating accuracy can be maintained and occurrence of noise can be suppressed.

The actuator 9 for oscillating the transducer supporting portion 8 for supporting the transducer is fixed on the outer periphery of the bearing coupling member 10 by means of bonding or press-fitting.

Next, methods of assembling the two bearing assemblies will be described.

First, the structures of the bearing assembly A for rotating the magnetic disk 1 and the bearing assembly B of the actuator 9 section are different from each other in the point that, as compared with the bearing coupling member 10 of the bearing assembly B, the bearing coupling member 2a of the bearing assembly A has a larger outer diameter in order to hold the magnet 3 arranged in a position beyond the coil 4, and does not cover that portion of the outer ring of the large-diameter bearing which is close to the coil 4, and however they are basically the same, and therefore the assembling method will be described about the bearing assembly B of the actuator 9 section.

Figure 5:
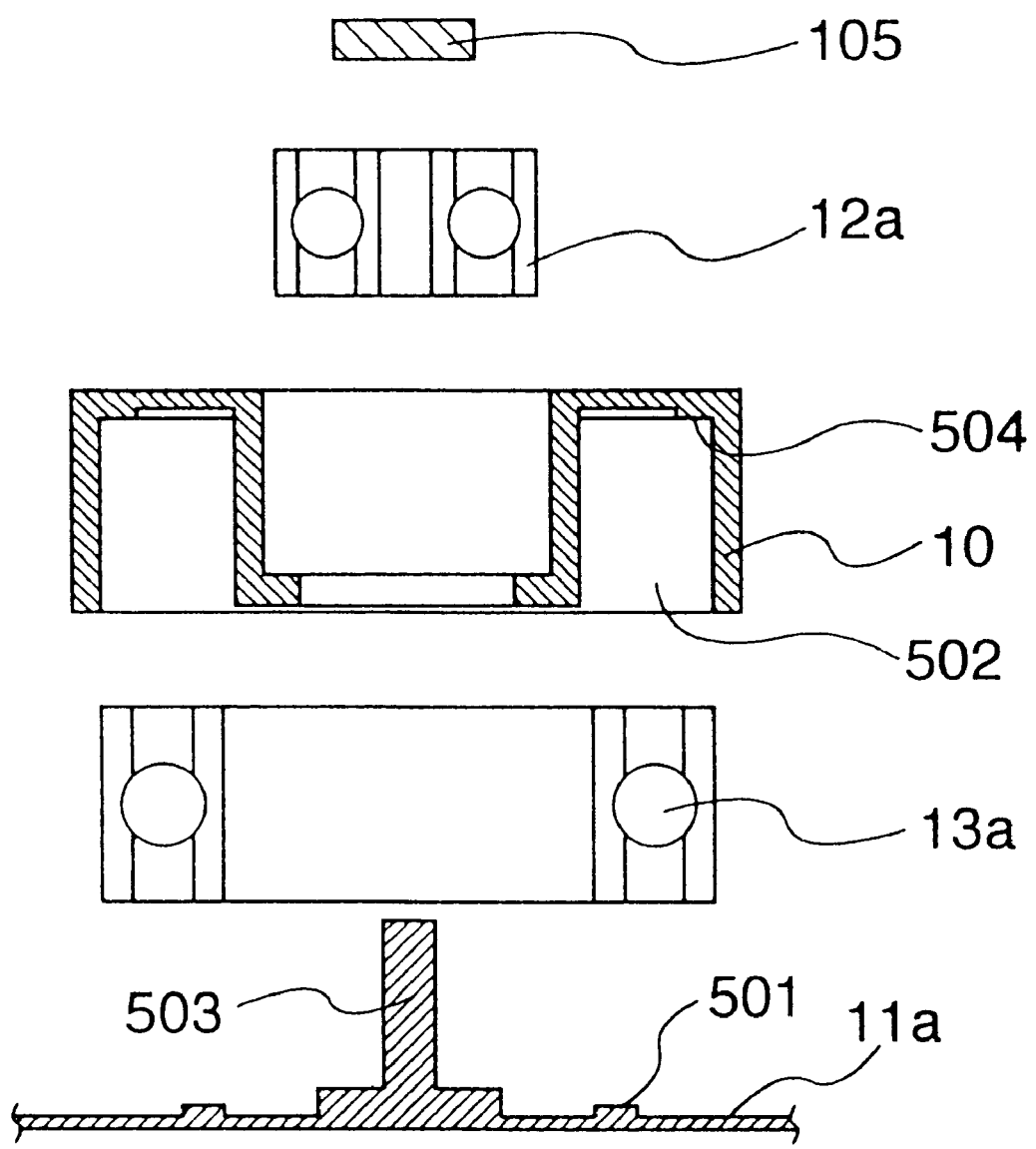
FIG. 5 is an illustration showing a manner of assembling the bearing assembly of the magnetic disk drive according to the first embodiment of the invention.

The method of assembling the bearing assembly B of the actuator 9 section will be described with reference to FIG. 5. First, the inner ring of the large-diameter bearing 13a is positioned on a fixing portion 501 formed on the base 11a having the shaft formed integrally therewith. At this time, a positioning jig is used to effect centering so as to align the center of the inner ring of the bearing 13a with the center of the shaft 503 formed integrally with the base 11a, and thereafter the both are fixed to each other by means of a bonding agent. Positioning may be performed by forming a step in the fixing portion 501 and fitting the inner ring of the bearing 13a therein, instead of bonding.

Then the large-diameter bearing 13a is received in a bearing receiving portion 502 of the bearing coupling member 10. In this state, the outer periphery of the outer ring of the bearing 13a is positioned by an outer peripheral portion of the receiving portion 502, while the axial end face of the outer ring is positioned by a fixing portion 504 formed in an upper surface portion of the receiving portion 502. At this time, the outer ring of the bearing 13a is bonded and fixed to the outer peripheral portion and the fixing portion 504 of the receiving portion 502. The fixing method is not limited to the bonding but may be press-fitting.

Subsequently, the inner periphery of the small-diameter bearing 12a is fitted on the shaft 503 formed integrally with the base 11a, and is fixed by means of the bearing fixing member 105.

In this assembling method, the large-diameter bearing 13a may be combined with the base 11a after having been inserted in the receiving portion 502 of the bearing coupling member 10.

In assembling, based on the rotating accuracy of each of the bearings measured beforehand, the large- and small-diameter bearings are assembled in such a manner that respective rotating deflections thereof cancel each other. By doing so, the rotating accuracy can be improved as compared with that measured before assembling.

In the magnetic disk drive of this embodiment, a height d from the lower surface of the base 7a to the fixing member 14 for fixing the magnetic disk 1 can take a value obtained by adding an axial height (thickness) of the bearing and 0.5 mm or so, as shown in FIG. 2, and therefore it can be reduced to about 1.5 mm considering that the height of the smallest bearing, available on the market, is 1.0 mm.

In consequence, a magnetic disk drive can be produced with an overall thickness less than 3.3 mm, which is the thickness of PCMCIA Standards TYPE 1. Therefore it is naturally possible to easily make a magnetic disk drive with a thickness 5 mm or 10.5 mm, which corresponds to the thicknesses of PCMCIA Standards TYPE 2 and TYPE 3 respectively. In this case, a magnetic disk setting section can be thickened in the axial direction so as to load a plurality of magnetic disks therein.

As described above, the two bearing assemblies, that is, the bearing assembly A for rotating the magnetic disk 1 and the bearing assembly B of the actuator 9 section can be made thinner.

According to this embodiment, bearings of different diameters are combined, and therefore it is possible to make the bearing assembly thinner. This makes it possible to make the magnetic disk drive itself thinner.

Further, the bases 7a and 11a each have the shaft formed integrally therewith, on which shaft the small-diameter bearing is to be fixed, and therefore the number of component parts can be reduced.

The structures of the bearing assemblies A and B constituting the magnetic disk drive, are substantially the same though the configurations of the bearing coupling members are different at the portion for holding the large-diameter bearing, and the present invention is applicable to the both, and therefore the structure of the bearing assembly A will be described below as the representative.

The bearings need to be prestressed for the purpose of rotating properly. Also in the bearing assembly of this embodiment, the heights of those surfaces of the bearing coupling member 2a which are brought into contact with the outer ring of the small-diameter bearing 6a and the outer ring of the large-diameter bearing 5a, are defined in such a manner that each of the bearings is applied with a prestressing force. By applying the prestressing force to each of the bearings, the rotating accuracy of the spindle motor is improved.

Figure 6:
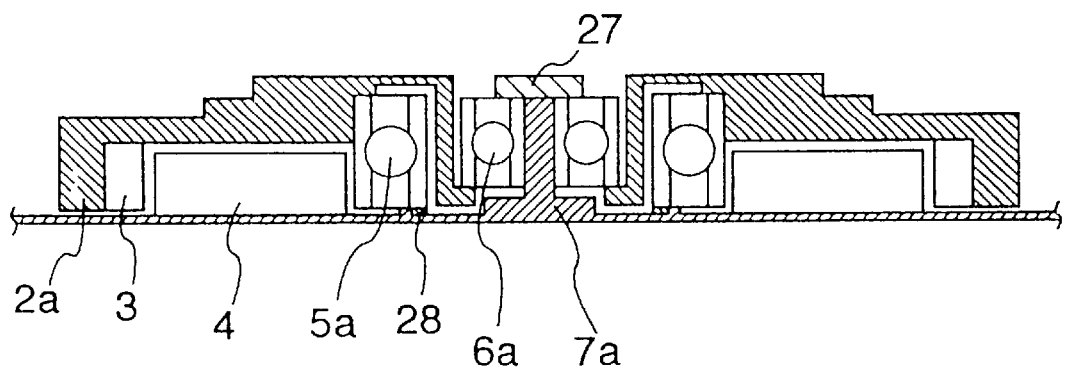
FIG. 6 is a sectional view illustrating a position where an elastic member is inserted in the bearing assembly of the magnetic disk drive according to the first embodiment of the invention.
Figure 7:
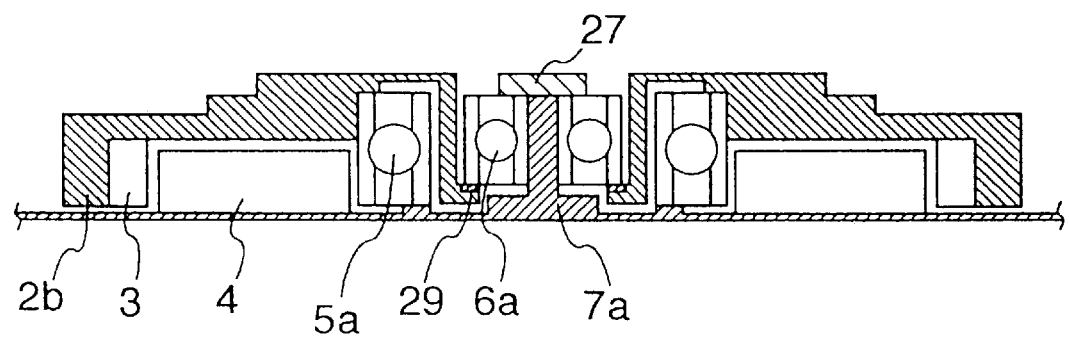
FIG. 7 is a sectional view illustrating another position where an elastic member is inserted in the bearing assembly of the magnetic disk drive according to the first embodiment of the invention.

As for the prestressing or preloading method for improving the rotating accuracy, in the structure of the bearing assembly A for rotating the magnetic disk 1, an elastic member 28 may be disposed at that portion of the inner ring of the large-diameter bearing 5a where the inner ring is fixed to a base 7b, as shown in FIG. 6. Moreover, an elastic member 29 may be disposed between the outer ring of the small-diameter bearing 6a and a bearing coupling member 2b, as shown in FIG. 7. If the elastic member is disposed as shown in FIGS. 6 and 7, there can be obtained what is called constant-pressure preloaded state in which the preloaded pressure can be made generally constant even if the manufacturing accuracy of the component parts varies a little.

Figure 8:
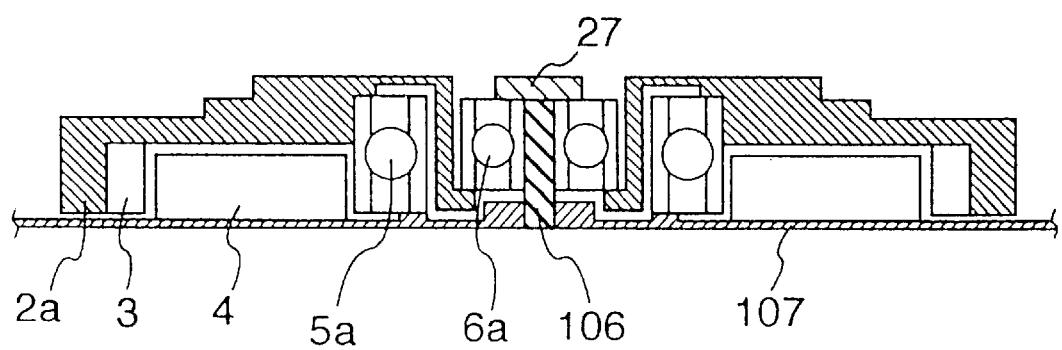
FIG. 8 is a sectional view of a bearing assembly of a magnetic disk drive according to a second embodiment of the invention.

A second embodiment of the invention will be described with reference to FIG. 8. FIG. 8 is a sectional view of a bearing assembly A section of a magnetic. disk drive according to this embodiment. This embodiment is different from the first embodiment in the structure of the fixing shaft on which the small-diameter bearing is fixed. A fixing shaft 106 is not formed integrally with a base 107 but formed as a separate part, and press-fitted in the base 107.

Since the shaft is formed as the separate part, the base 107 is easy to machine. It is advisable to perform an additional machining after the press-fitting in order to provide perpendicularity with respect to the base 107.

Figure 9:
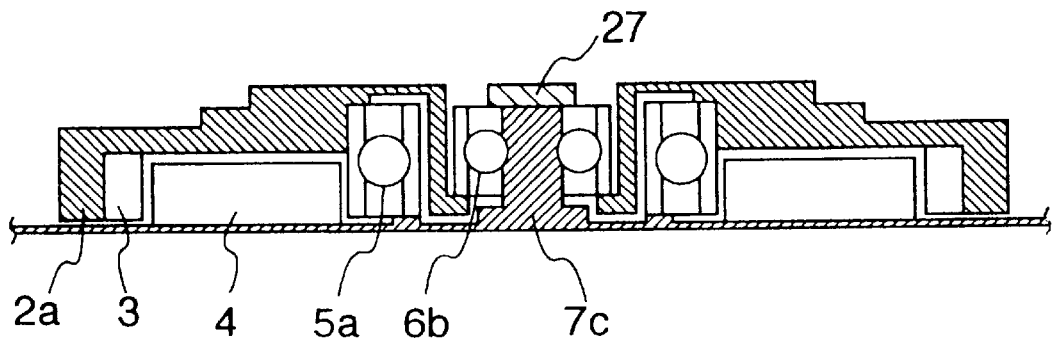
FIG. 9 is a sectional view of a bearing assembly of a magnetic disk drive according to a third embodiment of the invention.

A third embodiment of the invention will be described with reference to FIG. 9. FIG. 9 is a sectional view of a bearing assembly A section of a magnetic dick drive of this embodiment. This embodiment is different from the first embodiment in the structure of the fixing shaft on which the small-diameter bearing is fixed. A fixing shaft on which the small-diameter bearing 6b is fixed, is formed integrally with a base 7c, the fixing shaft being so shaped as to serve as an inner ring of the small-diameter bearing. The bearing assembly of this embodiment is assembled in the same manner as that of the first embodiment up to the step of attaching the bearing coupling member. In assembling the small-diameter bearing, an outer ring is first placed about the fixing shaft and then pulled to one side to come in contact with the bearing coupling member so as to widen the space between the fixing shaft and the outer ring, and balls are inserted into the space and then located in the predetermined positions around the fixing shaft by means of a retainer (not shown). Accordingly, it is necessary that a distance between the bearing coupling member and the outer ring of the small-diameter bearing is wide enough to allow the balls to be inserted when the outer ring is pulled to one side. In the structure of this embodiment, the elastic member of the first embodiment shown in FIGS. 6 and 7 may be disposed.

Figure 10:
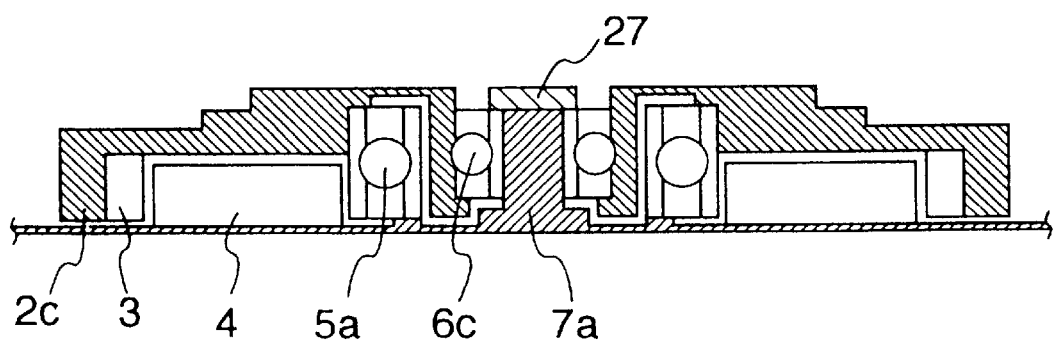
FIG. 10 is a sectional view of a bearing assembly of a magnetic disk drive according to a fourth embodiment of the invention.

A fourth embodiment of the invention will be described with reference to FIG. 10. FIG. 10 is a sectional view of a bearing assembly A section of a magnetic disk drive of this embodiment. This embodiment is different from the first embodiment in the structure of a bearing coupling member 2c. In this embodiment, an outer ring of a small-diameter bearing 6c is formed integrally with the bearing coupling member 2c. The manner of assembling the bearing assembly of this embodiment is different from the third embodiment. Namely, balls and an inner ring, constituting the small-diameter bearing 6c, are beforehand inserted in the bearing coupling member 2c and positioned by a retainer, and then the bearing coupling member 2c is fitted on the fixing shaft and the outer ring of the large-diameter bearing. In this embodiment as well, the elastic member shown in FIG. 6 may be disposed on a fixing portion between the outer ring of the large-diameter bearing and the base 7a.

Figure 11:
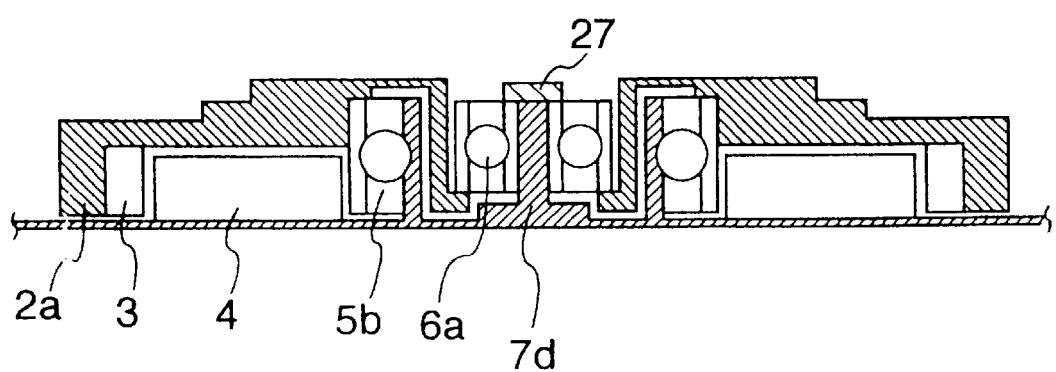
FIG. 11 is a sectional view of a bearing assembly of a magnetic disk drive according to a fifth embodiment of the invention.

A fifth embodiment of the invention will be described with reference to FIG. 11. FIG. 11 is a sectional view of a bearing assembly A section of a magnetic disk drive of this embodiment. This embodiment is different from the first embodiment in the configuration of a base 7d. In this embodiment, an inner ring of a large-diameter bearing 5b is formed integrally with the base 7d. In this embodiment as well, after balls and an outer ring of the large-diameter bearing have separately been inserted in and fixed to that portion of the base 7d corresponding to the inner ring, the bearing assembly can be assembled in the same manner as the first embodiment.

Also in this embodiment, the elastic member shown in FIG. 7 may be disposed on a fixing portion between the outer ring of the small-diameter bearing and the bearing coupling member 2b.

According to the structures of the above-described third to fifth embodiments, the bearing coupling member is formed integrally with the part for the bearing, and therefore the number of component parts can advantageously be reduced.

A sixth embodiment of the invention will be described with reference to FIGS. 12 to 16.

Figure 12:
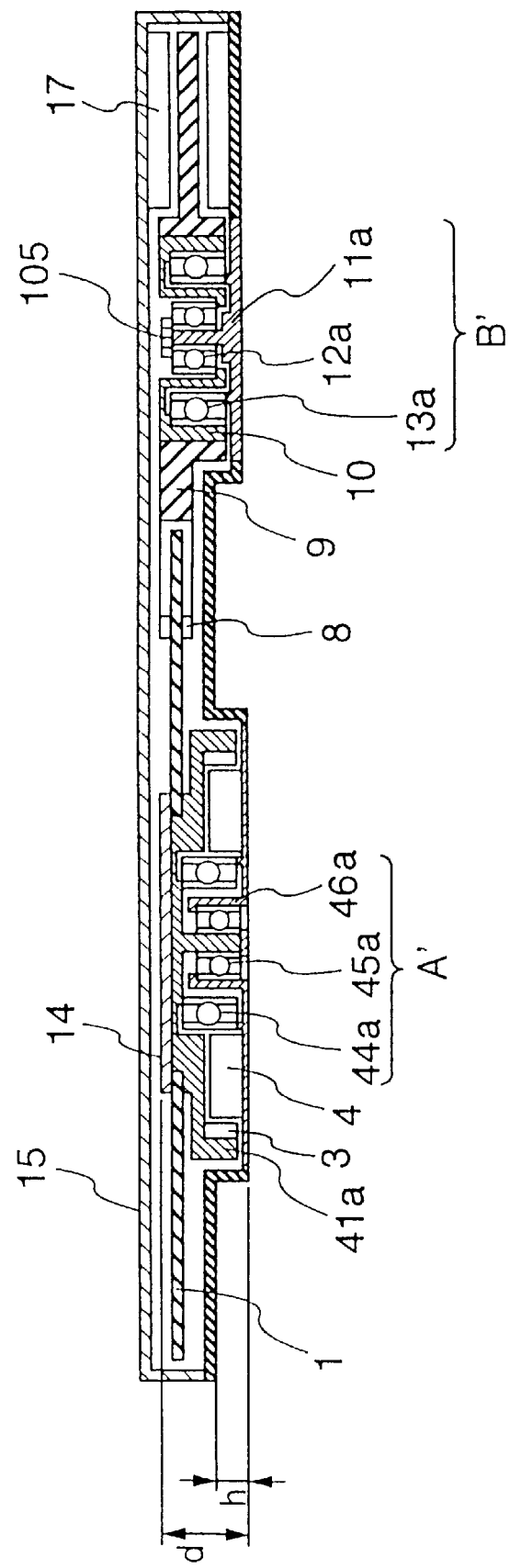
FIG. 12 is a sectional view of a magnetic disk drive according to a sixth embodiment of the invention.
Figure 13:
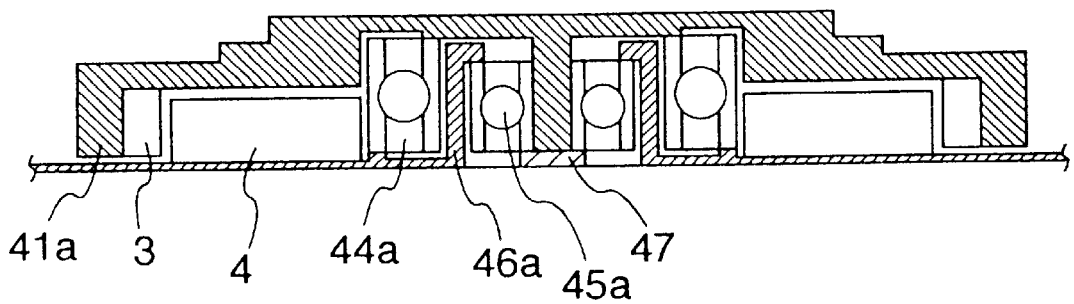
FIG. 13 is an enlarged sectional view of a bearing assembly C section of FIG. 12.

FIG. 12 is a sectional view of a magnetic disk drive according to this embodiment. As shown in FIG. 12, the magnetic disk drive of this embodiment comprises, similarly to the magnetic disk drive of the first embodiment shown in FIG. 2, a transducer, a transducer support portion 8, an actuator 9, a magnetic disk 1, a fixing member 14 for fixing the magnetic disk 1, a spindle motor for rotating the magnetic disk 1, a base on which the actuator and the spindle motor are fixed, a cover 15, and two bearing assemblies, that is, a bearing assembly A' for rotating the magnetic disk 1 (corresponding to the bearing assembly A of FIG. 2) and a bearing assembly B' of the actuator 9 section (corresponding to the bearing assembly B of FIG. 2). In this embodiment, the structure of the bearing assembly B' shown in FIG. 12 is the same as that of the bearing assembly B of FIG. 2.

Symbols h and d denote a space for mounting a printed circuit board and a height from the base to the disk fixing member, respectively, similarly to FIG. 2.

This embodiment is different from the abovementioned first to fifth embodiments in that the fixing shaft serving as the axis of rotation of the bearing assembly A' for rotating the magnetic disk 1, is designed to rotate with the bearing assembly A'. This structure will be described in detail with reference to FIG. 13 which shows, on an enlarged scale, the bearing assembly A' section of FIG. 12.

A rotating portion comprises a bearing coupling member 41a, and a magnet 3 is attached to the bearing coupling member 41a. A coil 4 is fixed to a base 46a in opposed relation to the magnet 3. The bearing coupling member 41a is rotated by means of the magnet 3 and the coil 4.

An inner ring of a first bearing 45a of smaller diameter and an inner ring of a second bearing 44a of larger diameter are connected and rotatably held by means of the bearing coupling member 41a in such a manner that the first bearing 45a of smaller diameter overlaps within an inner periphery of the second bearing 44a of larger diameter in the heightwise direction of the bearing. An outer ring of the first bearing 45a of smaller diameter and an outer ring of the second bearing 44a of larger diameter are held through the medium of the base 46a.

The bearing coupling member 41a and the inner ring of the first bearing 45a of smaller diameter are fixed to each other by means of a fixing member 47 on the base side of the inner ring of the bearing 45a. Fixing may be performed by means of either bonding or screwing.

At this time, the height between those surfaces, with which the outer rings of the first bearing 45a of smaller diameter and the second bearing 44*a* of larger diameter are brought into contact, is prescribed in such a manner that each of the bearings is applied with a preloading force, and therefore the rotating accuracy of the spindle motor is improved.

Figure 14:
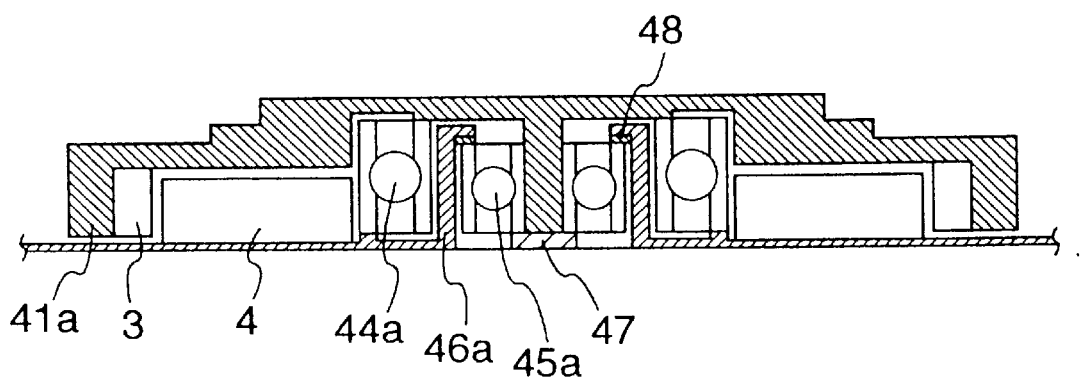
FIG. 14 is a sectional view illustrating a position where an elastic member is inserted in the bearing assembly of the magnetic disk drive according to the sixth embodiment of the invention.
Figure 15:
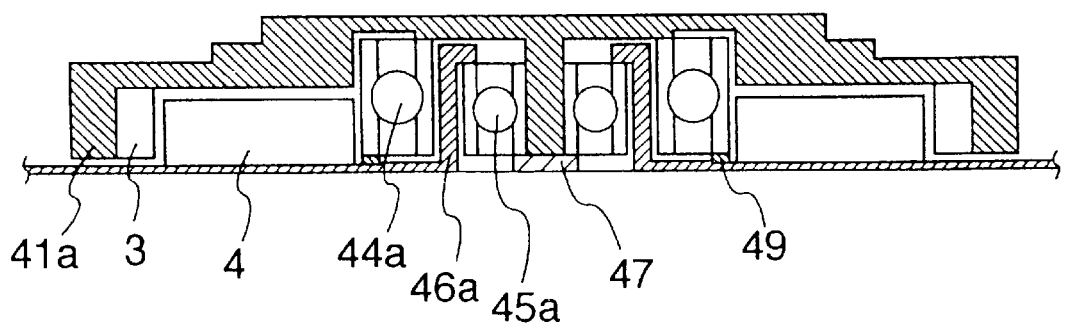
FIG. 15 is a sectional view illustrating another position where an elastic member is inserted in the bearing assembly of the magnetic disk drive according to the sixth embodiment of the invention.

As for the preloading method for improving the rotating accuracy, an elastic member 48 may be disposed between the outer ring of the first bearing 45*a* of smaller diameter and the base 46*a* as shown in FIG. 14. Moreover, an elastic member 49 may be interposed between the outer ring of the second bearing 44*a* of larger diameter and the base 46*a* as shown in FIG. 15. Placing the elastic member makes it possible to obtain what is called constant-pressure preloaded state in which the preloaded pressure can be made substantially constant even if the manufacturing accuracy of the component parts varies a little.

Figure 16:
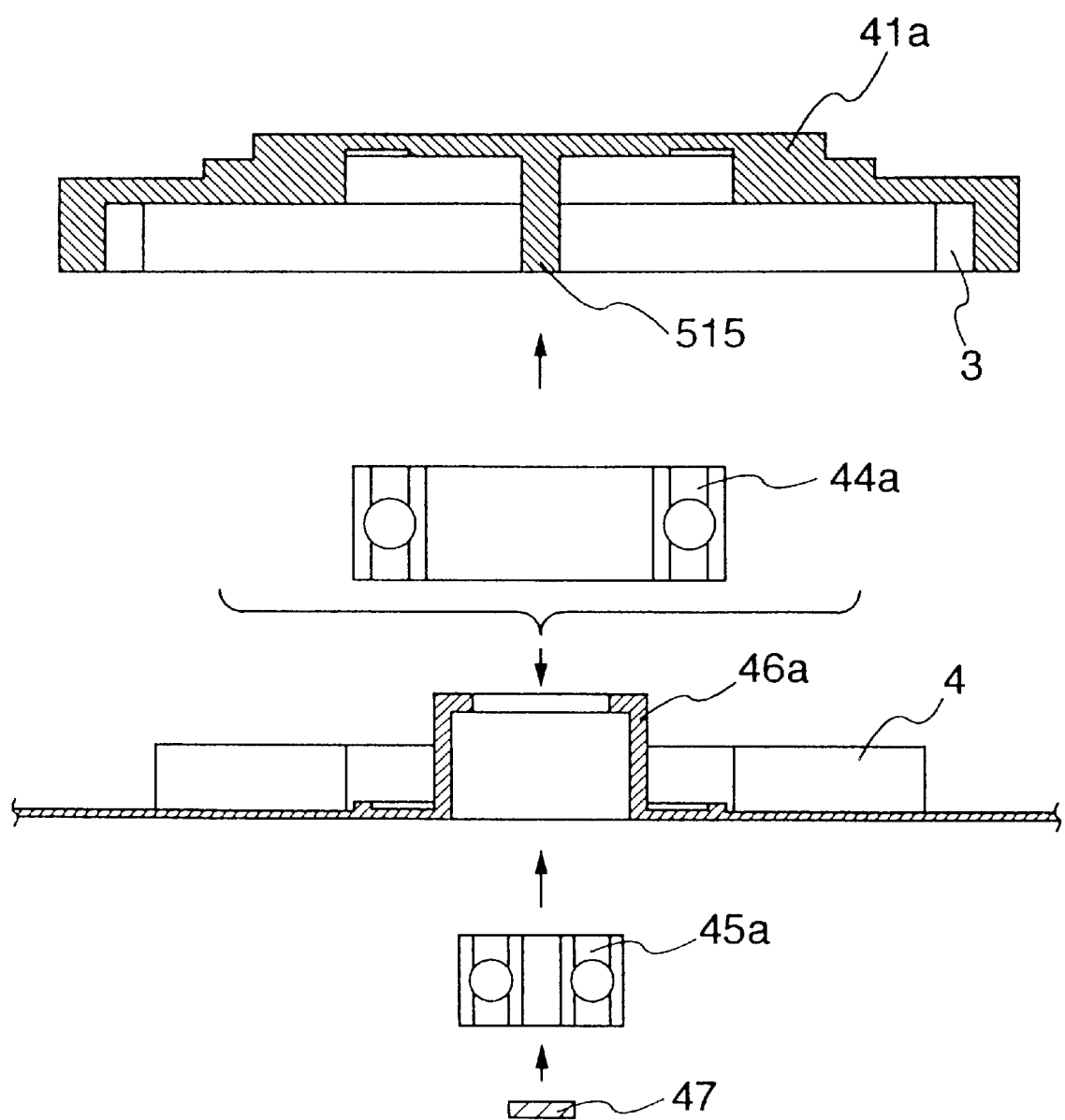
FIG. 16 is an illustration showing a manner of assembling the bearing assembly of the magnetic disk drive according to the sixth embodiment of the invention.

The method of assembling the bearing assembly of this embodiment is shown in FIG. 16. Namely, the small-diameter bearing 45*a* is fitted in the base 46*a*. Then the large-diameter bearing 44*a* is fitted in the bearing coupling member 41*a* having a rotating shaft 515. Subsequently, the rotating shaft 515 of the bearing coupling member 41*a* having the large-diameter bearing 44*a* fitted therein, is fitted in the inner ring of the small-diameter bearing 45*a* fitted in the base 46*a*, thereby making it possible to arrange the small-diameter bearing within the inner periphery of the large-diameter bearing. Finally, in order to fix the bearings, the fixing member 47 is so attached as to fix the rotating shaft 515 and the inner ring of the bearing 45*a*. According to this embodiment, the bearing assembly can be assembled easily because the parts are positioned individually, and it is suited for mass production because the number of assembling steps is small.

As described above, the first bearing 45*a* of smaller diameter is so held as to be arranged within the inner periphery of the second bearing 44*a* of larger diameter, and therefore the bearing assembly can be made thin in height and hence the magnetic disk drive can be made thin in overall height.

Figure 17:
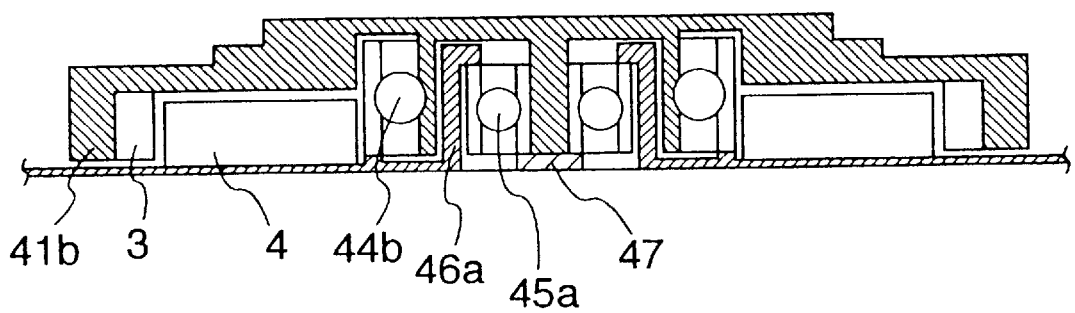
FIG. 17 is a sectional view of a bearing assembly of a magnetic disk drive according to a seventh embodiment of the invention.

A seventh embodiment of the invention will be described with reference to FIG. 17. FIG. 17 is a sectional view of a bearing assembly A' section of a magnetic disk drive of this embodiment. This embodiment is different from the sixth embodiment in the structure of a bearing coupling member 41*b*. The bearing coupling member 41*b* is formed integrally with an inner ring of a large-diameter bearing 44*b*.

Also in this embodiment, as for the preloading method for improving the rotating accuracy, an elastic member may be disposed in the same manner as the sixth embodiment shown in FIGS. 14 and 15.

Figure 18:
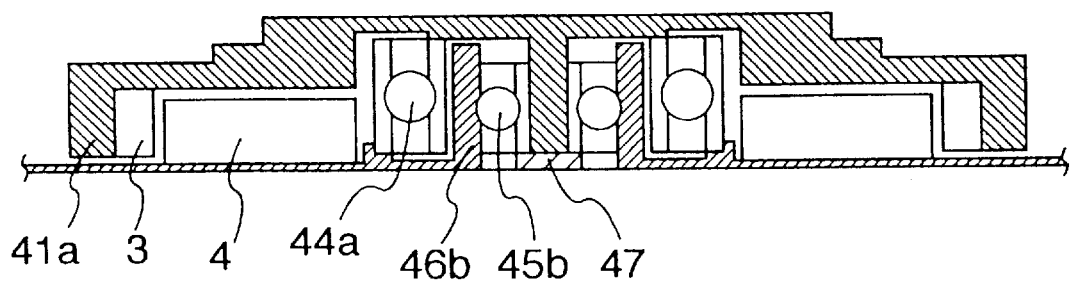
FIG. 18 is a sectional view of a bearing assembly of a magnetic disk drive according to an eighth embodiment of the invention.

An eighth embodiment of the invention will be described with reference to FIG. 18. FIG. 18 is a sectional view of a bearing assembly A' section of a magnetic disk drive of this embodiment. This embodiment is different from the sixth embodiment in the structure of a base 46*b*. The base 46*b* is formed integrally with an outer ring of a small-diameter bearing 45*b*.

In this embodiment as well, as for the prestressing method for improving the rotating accuracy, an elastic member may be disposed on a fixing portion between the outer ring of the large-diameter bearing 44*a* and the base 46*b* and on a fixing portion between the inner ring of the large-diameter bearing 44*a* and the bearing coupling member 41*a*.

Figure 19:
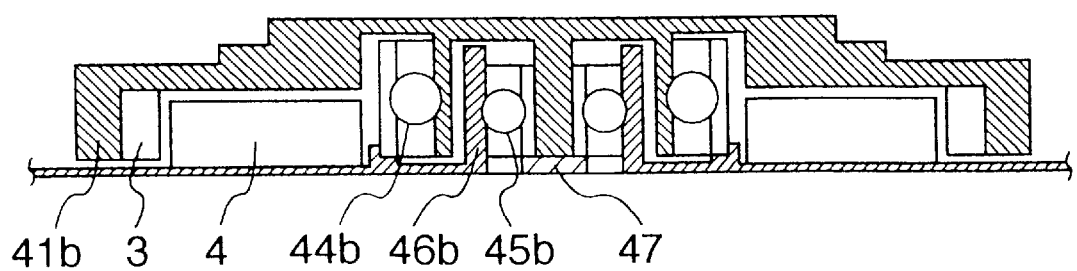
FIG. 19 is a sectional view of a bearing assembly of a magnetic disk drive according to a ninth embodiment of the invention.
Figure 20:
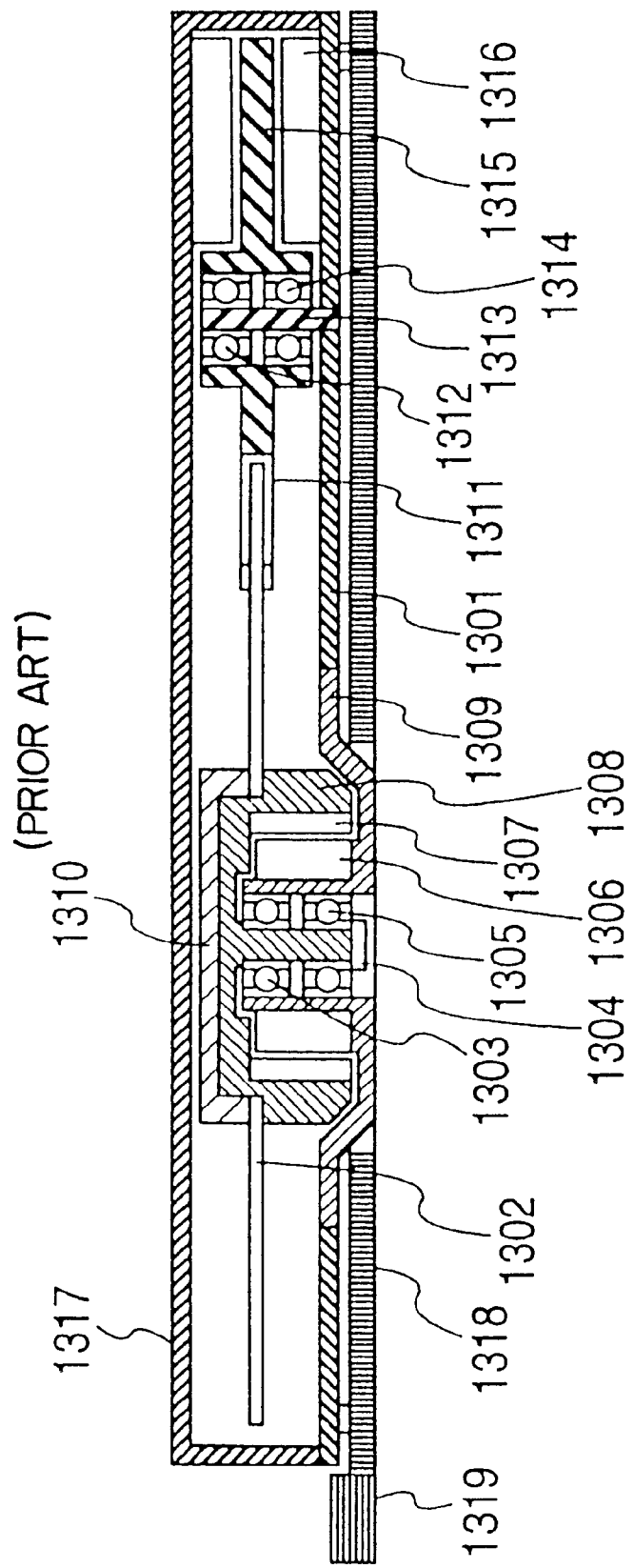
FIG. 20 is a sectional view of a conventional magnetic disk drive.
Figure 21:
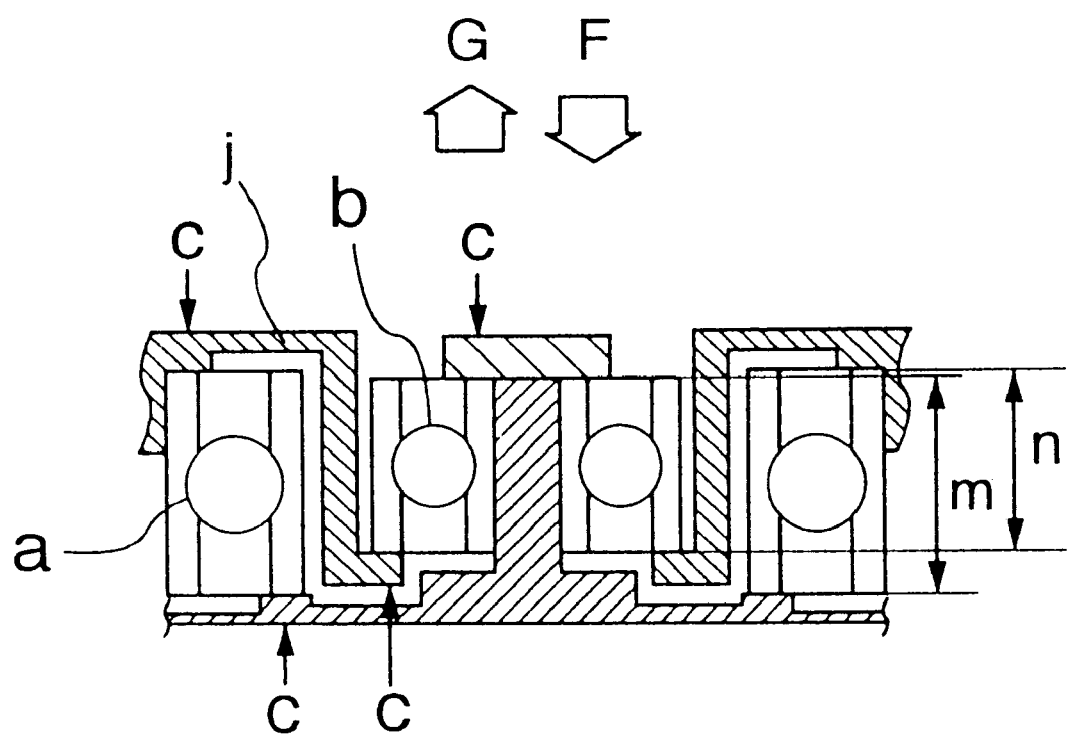
FIG. 21 is a sectional view illustrating the function of a bearing coupling member of the present invention.

A ninth embodiment of the invention will be described with reference to FIG. 19. FIG. 19 is a sectional view of a bearing assembly A' section of a magnetic disk drive of this embodiment. This embodiment is different from the other embodiments in that the bearing assembly A' has a structure obtained by combining the seventh and eighth embodiments. More specifically, there are employed the same base 46*b* as the eighth embodiment which is formed integrally with the outer ring of the small-diameter bearing 45*b*, and the same bearing coupling member 41*b* as the seventh embodiment which is formed integrally with the inner ring of the large-diameter bearing 44*b*.

Also in this embodiment, as for the prestressing method for improving the rotating accuracy, an elastic member may be disposed on a fixing portion between the outer ring of the large-diameter bearing 44*b* and the base 46*b*.

According to the structures of the above seventh to ninth embodiments, the bearing coupling member is formed integrally with the part for the bearing, and therefore the number of parts can advantageously be decreased.

According to the present invention, two bearings of different sizes are combined so that the small-diameter bearing is arranged within the inner ring of the large-diameter bearing, and therefore the bearing assembly can be made thin and hence the magnetic disk drive using this bearing assembly can be made smaller and thinner.

What is claimed is:

1. A magnetic disk drive including a spindle motor having a stator and a rotor for rotating a magnetic disk having magnetic information stored thereon; a transducer for writing and/or reading information on said magnetic disk; and an actuator for moving said transducer on a surface of said magnetic disk, characterized in that at least one of bearing assemblies for rotating said spindle motor and for oscillating said actuator comprises a large-diameter bearing of discrete construction including an inner ring and an outer ring, a small-diameter bearing of discrete construction including an inner ring and an outer ring, an inner ring coupling member for connecting said inner rings of the large- and small-diameter bearings, and an outer ring coupling member for connecting said outer rings of the large- and small-diameter bearings;

wherein one of said large-diameter bearing and said small-diameter bearing has a larger rotational axis thickness than the other, and at least a portion of a rotational axis thickness of the other of said large-diameter bearing and said small-diameter bearing is disposed within said larger rotational axis thickness; and wherein both said large-diameter bearing and said small-diameter bearing are disposed at radial positions which are inside of a radial position of said stator and a rotor of said spindle motor.

2. A magnetic disk drive as claimed in claim 1, further comprising a bearing preload arrangement to apply constant loads axially in opposite directions to said large-diameter bearing and said small-diameter bearing so as to apply constant prestressing to said bearings.

3. A magnetic disk drive comprising a spindle motor having a stator and a rotor for rotating a magnetic disk having magnetic information stored thereon; a transducer for writing and/or reading information on said magnetic disk; and an actuator for moving said transducer on a surface of said magnetic disk, characterized in that at least one of bearing assemblies for rotating said spindle motor and for oscillating said actuator comprises a large-diameter bearing of discrete construction including an inner ring and an outer ring, a small-diameter bearing of discrete construction including an inner ring and an outer ring, an inner ring coupling member for connecting said inner rings of the large- and small-diameter bearings, and an outer ring coupling member for connecting said outer rings of the large- and small-diameter bearings;

wherein one of said large-diameter bearing and said small-diameter bearing has a larger rotational axis thickness than the other;

wherein an entirety of said rotational axis thickness of the other of said large-diameter bearing and said small-diameter bearing, is disposed within said larger rotational axis thickness; and wherein both said large-diameter bearing and said small-diameter bearing are disposed at radial positions which are inside of a radial position of said stator and said rotor of said spindle motor.

4. A magnetic disk drive as claimed in claim 3, further comprising a bearing preload arrangement to apply constant loads axially in opposite directions to said large-diameter bearing and said small-diameter bearing so as to apply constant prestressing to said bearings.

5. A bearing assembly for use with a spindle motor having a stator and a rotor comprising two bearings each of discrete construction from one another and including an inner ring and an outer ring, said two bearings having the same axis of rotation and joined together rotatably, characterized in that said two bearings comprise a large diameter bearing and a small-diameter bearing; an inner ring coupling member for connecting inner rings of the large- and small-diameter bearings; and an outer ring coupling member for connecting outer rings of the large and small-diameter bearings, and wherein an outer diameter of said small-diameter bearing is smaller than an inner diameter of the inner ring of said large diameter bearing;

wherein one of said large-diameter bearing and said small-diameter bearing has a larger rotational axis thickness than the other, and at least a portion of a rotational axis thickness of the other of said large-diameter bearing and said small-diameter bearing is disposed within said larger rotational axis thickness; and wherein both said large-diameter bearing and said small-diameter bearing are disposed at radial positions which are inside of a radial position of said stator and said rotor of said spindle motor.

6. A bearing assembly as claimed in claim 5, further comprising a bearing preload arrangement to apply constant loads axially in opposite directions to said large-diameter bearing and said small-diameter bearing so as to apply constant prestressing to said bearings.

7. A bearing assembly for use with a spindle motor having a stator and a rotor comprising two bearings each of discrete construction from one another and including an inner ring and an outer ring, said two bearings having the same axis of rotation and joined together rotatably, characterized in that said two bearings comprise a large-diameter bearing and a small-diameter bearing; an inner ring coupling member for connecting inner rings of the large- and small-diameter bearings; and an outer ring coupling member for connecting outer rings of the large and small-diameter bearings, and wherein an outer diameter of said small-diameter bearing is smaller than an inner diameter of the inner ring of said large diameter bearing;

wherein one of said large-diameter bearing and said small-diameter bearing has a larger rotational axis thickness than the other;

wherein an entirety of said rotational axis thickness of the other of said large-diameter bearing and said small-diameter bearing, is disposed within said larger rotational axis thickness; and wherein both said large-diameter bearing and said small-diameter bearing are disposed at radial positions which are inside of a radial position of said stator and said rotor of said spindle motor.

8. A bearing assembly as claimed in claim 7, further comprising a bearing preload arrangement to apply constant loads axially in opposite directions to said large-diameter bearing and said small-diameter bearing so as to apply constant prestressing to said bearings.

* * * * *